US005616999A

United States Patent [19]
Matsumura et al.

[11] Patent Number: 5,616,999
[45] Date of Patent: Apr. 1, 1997

[54] TORQUE DETECTING APPARATUS FOR REDUCING TORQUE RIPPLE IN AN AC MOTOR

[75] Inventors: Masafumi Matsumura, Kariya; Sigeyuki Itou, Nagoya, both of Japan

[73] Assignee: Nippondenso Co., Ltd., Kariya, Japan

[21] Appl. No.: 386,498

[22] Filed: Feb. 10, 1995

[30] Foreign Application Priority Data

Feb. 10, 1994 [JP] Japan ................................ 6-016635

[51] Int. Cl.⁶ ................................................ H02P 7/00
[52] U.S. Cl. ................................................ 318/632; 318/432
[58] Field of Search .................................... 318/432, 632, 318/434, 254, 138, 439, 748–815

[56] References Cited

U.S. PATENT DOCUMENTS

| | | | |
|---|---|---|---|
| 4,528,486 | 7/1985 | Flaig et al. | 318/254 |
| 4,544,868 | 10/1985 | Murty | 318/439 X |
| 4,633,423 | 12/1986 | Bailey | 318/632 |
| 4,814,683 | 3/1989 | Okamoto et al. | 318/800 |
| 4,876,491 | 10/1989 | Squires et al. | 318/138 |
| 5,023,924 | 6/1991 | Tajima et al. | 388/811 |

FOREIGN PATENT DOCUMENTS

| | | |
|---|---|---|
| 63-103685 | 5/1988 | Japan . |
| 2-228286 | 9/1990 | Japan . |
| 6-46595 | 2/1994 | Japan . |

*Primary Examiner*—Jonathan Wysocki
*Attorney, Agent, or Firm*—Cushman Darby & Cushman IP Group of Pillsbury Madison & Sutro, LLP

[57] ABSTRACT

A torque detecting apparatus for an AC motor is provided which includes a current detecting circuit, an angular position detecting circuit, a torque detecting circuit, and a ripple reducing circuit. The current detecting circuit detects a phase current flowing through each winding of the motor. The torque detecting means determines a torque value indicative of the amount of torque of the AC motor based on the phase currents detected by the current detecting circuit according to an angular position detected by the angular position detecting circuit. The ripple reducing circuit reduces ripple contained in the torque value according to the angular position of the motor for determining an accurate amount of torque of the motor.

19 Claims, 5 Drawing Sheets

FIG. 4(b)
THE INVENTION

FIG. 5

TORQUE DETECTING APPARATUS FOR REDUCING TORQUE RIPPLE IN AN AC MOTOR

BACKGROUND OF THE INVENTION

1 Technical Field of the Invention

The present invention relates generally to a torque detecting apparatus for an AC motor, and more particularly to an improved circuit structure of a torque detecting apparatus for measuring torque of an AC motor based on phase current flowing through each winding of the motor.

2 Background Art

Such a type of torque detecting apparatus is conventionally designed to detect a current flowing through each winding of an AC motor and output the greatest one of the currents detected as indicating a torque value of the AC motor.

In general, the current flowing through each winding of an AC motor varies in sine wave form according to motor rotation. For example, a three-phase motor has a given phase angle of 120 deg. in electrical angle, while a two-phase motor has a given phase angle of 180 deg. in electrical angle. Thus, a conventional torque detecting apparatus measures torque of the AC motor by selecting based on a motor angular position a-winding through which a maximum current flows, to detect the current of the selected winding as indicating a torque value.

Such a prior art torque detecting apparatus, however, encounters the drawback in that a variation component of current flowing through each winding will be contained as ripple in a torque value measured since the current of each winding varies in sine wave form.

Accordingly, when a deviation between measured motor torque and target torque is determined to correct energization current flowing through each winding so as to maintain a constant value of zero (0) under feedback control, a control signal provided based on the deviation will undesirably include ripple components, thus leading to unstable feedback control.

SUMMARY OF THE INVENTION

It is therefore a principal object of the present invention to avoid the disadvantages of the prior art.

It is another object of the present invention to provide a torque detecting apparatus for an AC motor which is designed to reduce ripple contained in a phase current flowing through each winding of the motor so as to derive an accurate torque value based on the ripple-reduced phase current.

According to one aspect of the present invention, there is provided a torque detecting apparatus for an AC motor which comprises a current detecting means for detecting phase currents flowing through windings of the AC motor, an angular position detecting means for detecting an angular position of the AC motor, a torque determining means for determining a torque value indicative of the amount of torque of the AC motor based on the phase currents detected by the current detecting means according to the angular position detected by the angular position detecting means, and a ripple reducing means for reducing ripple contained in the torque value determined by the torque determining means according to the angular position detected by the angular position detecting means.

In the preferred mode of the invention, the torque determining means selects the greatest phase current from the phase currents flowing through the windings of the motor to provide the greatest phase current as indicating the torque value.

The ripple reducing means includes a memory which stores therein ripple correction values determined for every given angular position of the motor according to variations in the phase currents. The ripple reducing means reads out of the memory one of the ripple correction values corresponding to the angular position of the motor to correct the torque value determined by the torque determining means based on the ripple correction value read.

The ripple correction values may be determined based on a value of current flowing through each winding of the AC motor at each of the given angular positions of the motor.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
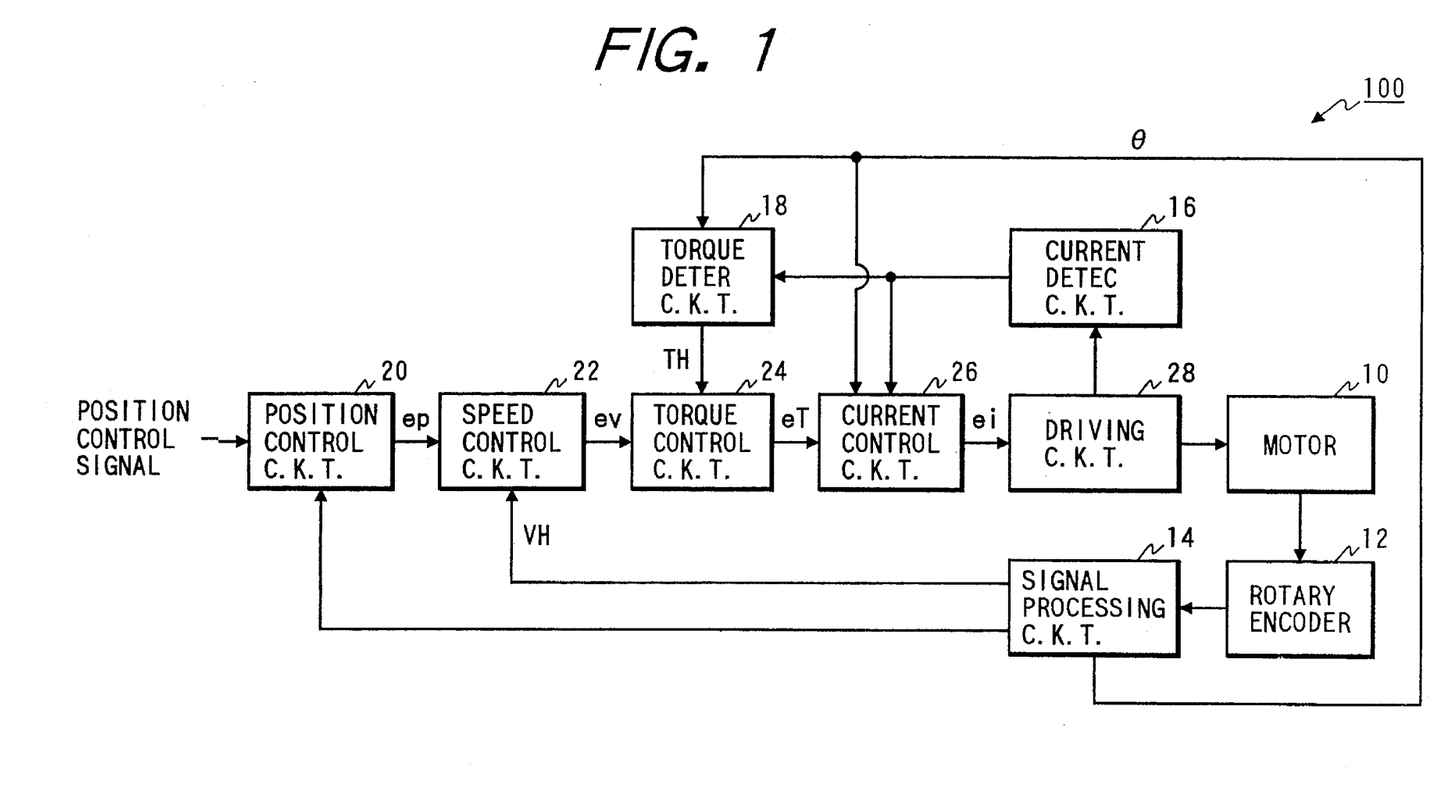
FIG. 1 is a block diagram which shows a motor control system including a torque detecting apparatus according to the present invention.

Referring now to the drawings, wherein like numbers refer to like parts in several views, particularly to FIG. 1, there is shown a motor control system 100 designed to control an angular position and torque of a three-phase motor 10 which is, in this embodiment, used for actuating a screw-tightening device mounted on the end of an arm of a robot.

The motor control system 100 generally includes a rotary encoder 12, a signal processing circuit 14, a current detecting circuit 16, and a torque determining circuit 18.

The rotary encoder 12 provides an angular position signal to the signal processing circuit 14 every rotational displacement of a given angle of the three-phase motor 10. The signal processing circuit 14 receives the angular position signal from the rotary encoder 12 to derive a rotational speed VM, an angular position (actual position), and an electrical angle θ indicative of a rotor angular position relative to each stator position of the three-phase motor. The current detecting circuit 16 measures currents iMU, iMV, and iMW flowing through windings of phases U, V, and W of the three-phase motor 10, respectively. The torque determining circuit 18 derives torque TM of the three-phase motor 10 based on the currents flowing through the phases U, V, and W detected by the current detecting circuit 16.

The motor control system 100 further includes a position control circuit 20, a speed control circuit 22, a torque control circuit 24, a current control circuit 26, and a driving circuit 28.

The position control circuit 20 is responsive to a position control signal issued from an external controller (not shown) and an angular position signal outputted from the signal processing circuit 14 to determine a positional deviation ep between a target angular position of a controlled object specified by the angular position signal and an actual angular position of the three-phase motor 10. The speed control circuit 22 determines, based on the positional deviation ep, a target rotational speed of the three-phase motor 10, and calculates a speed deviation ev between the target rotational speed and the actual rotational speed VH derived by the signal processing circuit 14.

The torque control circuit 24 determines a target torque T of the three-phase motor 10 based on the speed deviation ev, and a torque deviation eT between the target torque T and the torque TM of the three-phase motor 10 determined by the torque determining circuit 18. The current control circuit 26 determines, based on the torque deviation eT, a target current to be supplied to the windings of the phases U, V, and W (practically, the phases U and W) to derive a current deviation el between the target current and current flowing through the windings of the phases U, V, and W.

The driving circuit 28 controls a current supply to the winding of each phase U, V, and W based on the current deviation ei determined by the current control circuit 26.

Figure 2:
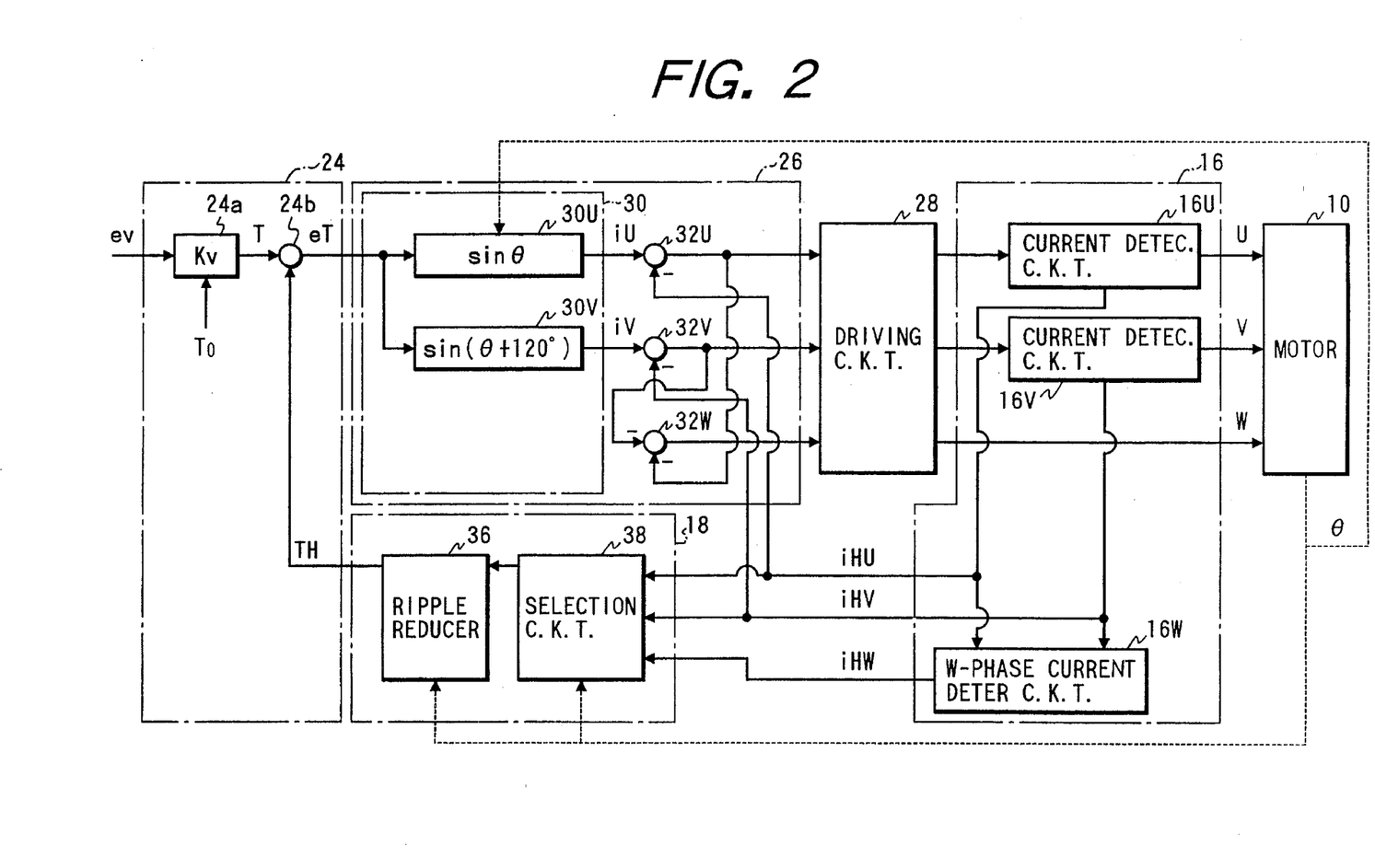
FIG. 2 is a circuit diagram which shows the circuit arrangement of the motor control system shown in FIG. 1.

The torque control circuit 24, as shown in FIG. 2, is composed of a target torque determining circuit 24a and a torque deviation determining circuit 24b. The target torque determining circuit 24a determines, based on the speed deviation ev provided by the speed control circuit 22 and a predetermined control parameter Kv, the target torque T of the three-phase motor 10 which is required to compensate for the speed deviation ev, or to decrease it to zero (0). The torque deviation determining circuit 24b derives the torque deviation eT (=T−TM) between the target torque T and the actual torque TM of the three-phase motor 10 determined by the torque determining circuit 18, and outputs it to the current control circuit 26.

The target torque determining circuit 24a, as apparent from the drawing, receives a torque control signal To which is provided by the external controller to determine the target torque T of the three-phase motor 10 so as to set screw-tightening torque produced by the screw-tightening device to a preselected torque To.

The current control circuit 26 is formed with a target current determining circuit 30 and current deviation determining circuits 32U, 32V, and 32W. The target current determining circuit 30 is composed of phase current determining circuits 30U and 30V which respectively determine target currents iU and iV to be supplied to the windings of the phases U and V of the three-phase motor 10 based on the torque deviation eT provided by the torque control circuit 24, the predetermined control parameter Kt, and the electrical angle θ according to the following equations.

$$iU = Kt \cdot \sin \theta \qquad (1)$$

$$iV = Kt \cdot \sin(\theta + 120 \text{ deg.}) \qquad (2)$$

The current deviation determining circuits 32U and 32V determine current deviations eiU (=iU−iMU) and eiV (=iV−iMV) between the target currents iU and iV calculated by the target current determining circuits 30U and 30V and actual currents iMU and iMV, measured by the current detecting circuit 16, which have flowed through the windings of the phases U and V. The current deviation determining circuit 32W then determines a current deviation eiW for the phase W using the equation below.

$$eiW = -eiU - eiV \qquad (3)$$

The current deviations eiU, eiV, and eiW are all sent to the driving circuit 28.

Figure 3:
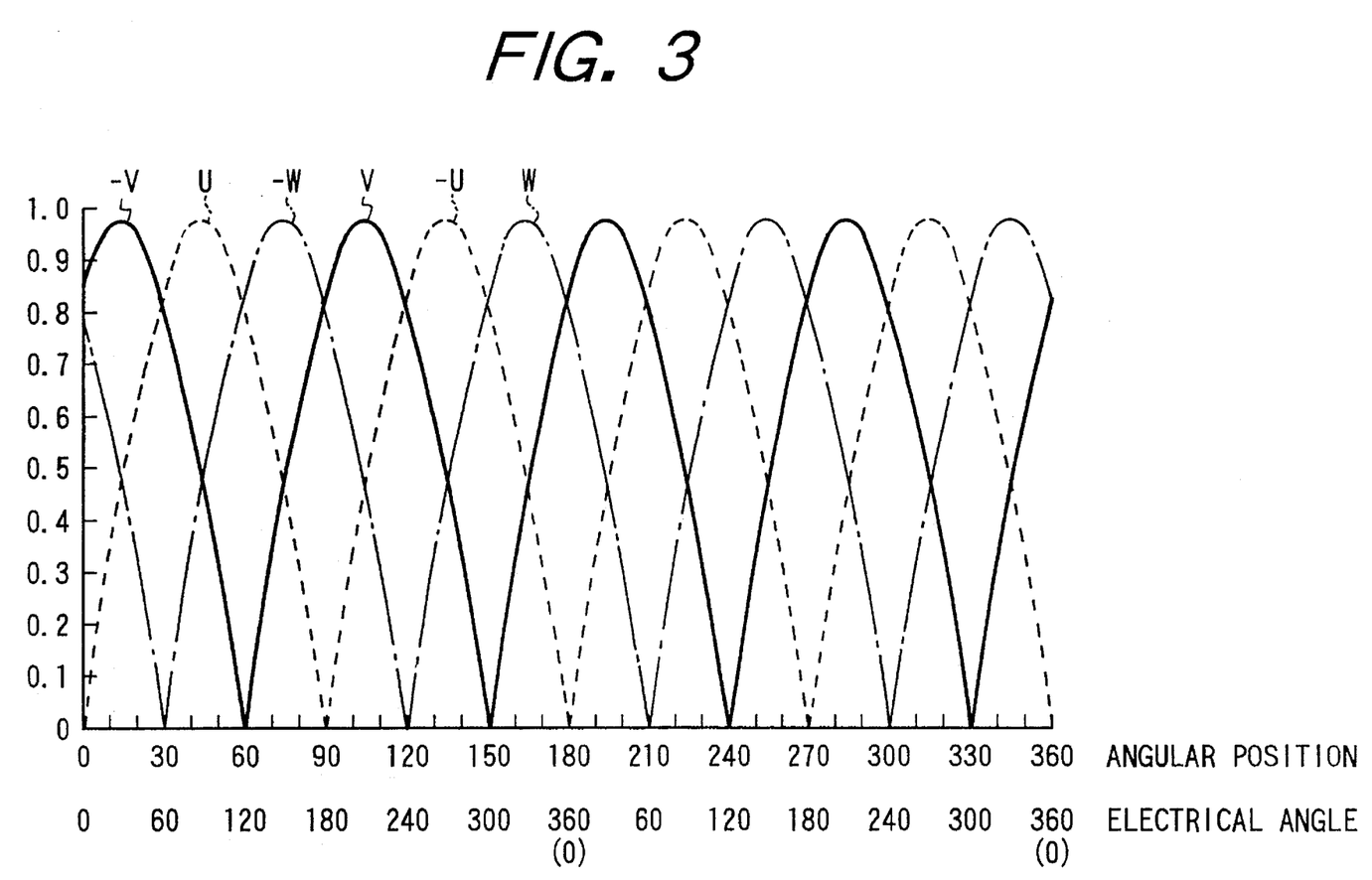
FIG. 3 is a graph which shows a waveform of phase current flowing through each winding of an AC motor.

The three-phase motor 10 is so designed as to change the electrical angle θ twice every revolution. The currents iMU, iMV, and iMW flowing through the windings of the phases U, V, and W must be timed to vary, as shown in FIG. 3, according to the electrical angle θ. The current control circuit 26, thus, determines the target currents iU and iV to be supplied to the windings of the phases U and V, and outputs the current deviations eiU, eiV, and eiW determined in the above manner to the driving circuit 28 so that the currents iMU, iMV, and iMW flowing through the windings of the phases U, V, and W are controlled to the target currents iU, iV, and iW.

The current deviation eiW, as discussed above, may be determined based on the current deviations eiU and eiV of the phases U and V without deriving a target current iW to be supplied to the winding of the phase W. This is based on the fact that the sum of current following through all the windings the three-phase motor 10 is zero (0). Accordingly, the target current iW may be expressed according to the relation below.

$$iW = Kt \cdot \sin(\theta - 120 \text{ deg.}) = -iU - iV \qquad (4)$$

Additionally, the current iMW actually flowing through the winding of the phase W may be determined based on the currents iMU and iMV inputted to the current deviation determining circuits 32U and 32V according to the following relation.

$$iMW = -iMU - iMV \qquad (5)$$

Thus, the current deviation eiW is $$eiW = iW - iMW = -(iU - iMU) - (iV - iMV) = -eiU - eiV$$

This embodiment, as apparent from the above discussion, uses the equation (3) to determine the current deviation eiW based on the current deviations eiU and eiV without deriving the target current iW itself.

The current detecting circuit 16 is mounted on circuit lines extending from the driving circuit 28 to the windings of the phases U and V of the three-phase motor 10, and includes current detectors 16U and 16V and a W-phase current determining circuit 15 16W. The current detectors 16U and 16V detect the current iMU and iMV flowing through the windings of the phases U and V. The W-phase current determining circuit 16W determines the current iMW flowing through the winding of the phase W based on the currents iMU and iMV measured by the current detectors 16U and 16V.

The current detecting circuit 16, as mentioned above, directly measures the currents iMU and iMV flowing through the windings of the phases V and W through the current detectors 16U and 16V and mathematically projects the current iMW flowing through the winding of the phase W using the equation (5) based on the fact that the sum of the currents iMU, iMV, and iMW is zero (0).

The torque determining circuit 18 includes a ripple reducer 36 and a selection circuit 38. The selection circuit 38 is designed to select the greatest one of the currents iMU, iMV, and iMW based on the electrical angle θ of the three-phase motor 10 found in the signal processing circuit 14. The ripple reducer 36 reduces a ripple component contained in the current selected by the selection circuit 38.

The currents iMU, iMV, and iMW flowing through the windings of the phases U, V, and W of the three-phase motor 10, as already shown in FIG. 3, are varied according to an angular position, or the electrical angle θ of the three-phase motor 10. However, the torque of the three-phase motor 10 may be determined easily based on a maximum value of current flowing therethrough. The torque determining circuit 18 is based on this fact to first determine in which winding a maximum value of current is flowing based on the electrical angle θ and to sample a current flowing through the winding so determined.

While the currents iMU, iMV, and iMW flowing through the windings of the phases U, V, and W are, as shown in FIG. 2, reversed alternately in positive and negative directions, the selection circuit 38 finds a phase having a maximum absolute current value based on the electrical angle θ to provide an absolute current value of that phase as indicating torque of the three-phase motor 10. Specifically, as clearly shown in FIG. 3, within a range from 0 to 60 deg. in the electrical angle θ, an absolute value of the current iMV of the phase W is the greatest one, while an absolute value of the current iMU of the phase U becomes greatest within a range from 60 to 120 deg. In this way, the phase having a maximum absolute current value is changed every rotation of 60 deg. in the electrical angle θ, and thus the current selected by the selection circuit 38 is changed at each 60 deg. of the electrical angle θ.

A value of the current thus selected by the selection circuit 38 corresponds to torque of the three-phase motor 10, and is, as discussed above, changed at each 60 deg. in the electrical angle θ, that is, every rotation of 30 deg. of the three-phase motor 10. Therefore, if a current value is inputted directly to the torque control circuit 24 as indicating torque of the three-phase motor 10, it will cause the torque deviation eT determined in the torque control circuit 24 to be varied periodically in synchronization with rotation of the three-phase motor 10, leading to unstable motor control. For overcoming this problem, the ripple reducer 36 is provided for reducing ripple contained in the current selected by the selection circuit 38 to produce a ripple-reduced current to the torque control circuit 24 as representing torque of the three-phase motor 10.

The determination of which of the currents flowing through the windings of the phases U, V, and W has been selected by the selection circuit 38 may be easily accomplished based on the electrical angle θ, and its current value is varied according to the equation employed in determining a target current in the current control circuit 26. Accordingly, the ripple reducer 36 is designed to determine, based on the electrical angle θ, which phase the current value selected by the selection circuit 38 corresponds to and calculate ripple-reduced torque TM using one of the following equations corresponding to the phase so determined.

U-phase $TM = iMU/(Ki \cdot \sin\theta)$ (6)

V-phase $TM = iMV/(Ki \cdot \sin\theta + 120 \text{ deg.})$ (7)

W-phase $TM = iMV/(Ki \cdot \sin\theta - 120 \text{ deg.})$ (8)

where Ki is a correction value.

As explained above, the determination of the torque TM of the three-phase motor 10 through the torque determining circuit 18 using the currents iMU, iMV, and iMW flowing through the windings of the phases U, V, and W determined by the current detecting circuit 16 is achieved by not only having the selection circuit 38 select a maximum current from among the currents iMU, iMV, and iMW, but also using the ripple reducer 36 to minimize the ripple contained in the maximum current selected so that the stable torque TM having no ripple is derived. This allows the three-phase motor 10 to be controlled in torque and angular position with high accuracy.

Figure 4A:
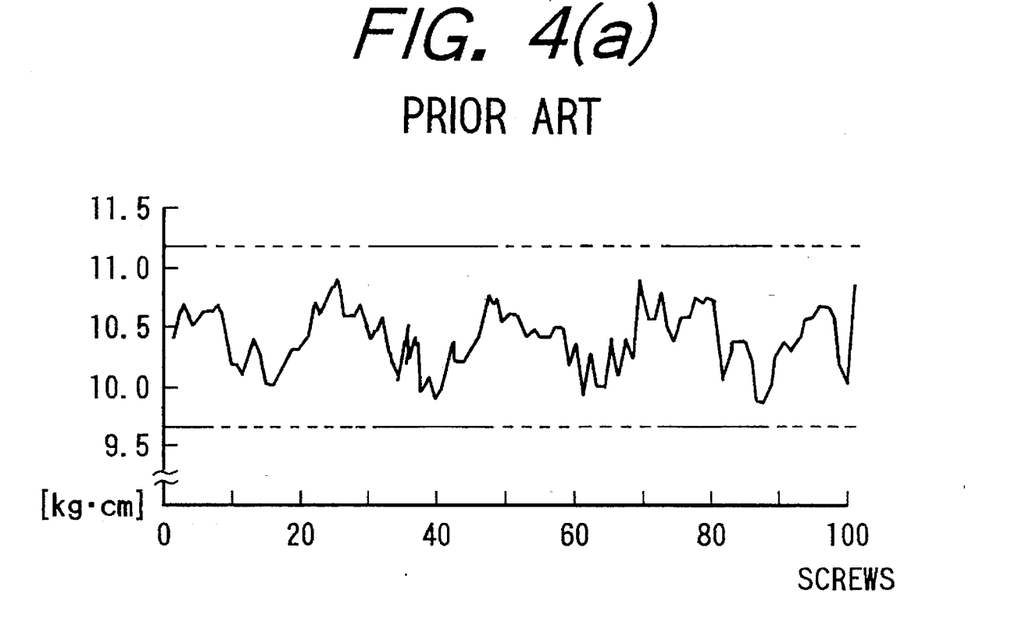
FIG. 4(a) is a graph which shows a variation in motor torque measured by a prior art torque detecting apparatus.
Figure 4B:
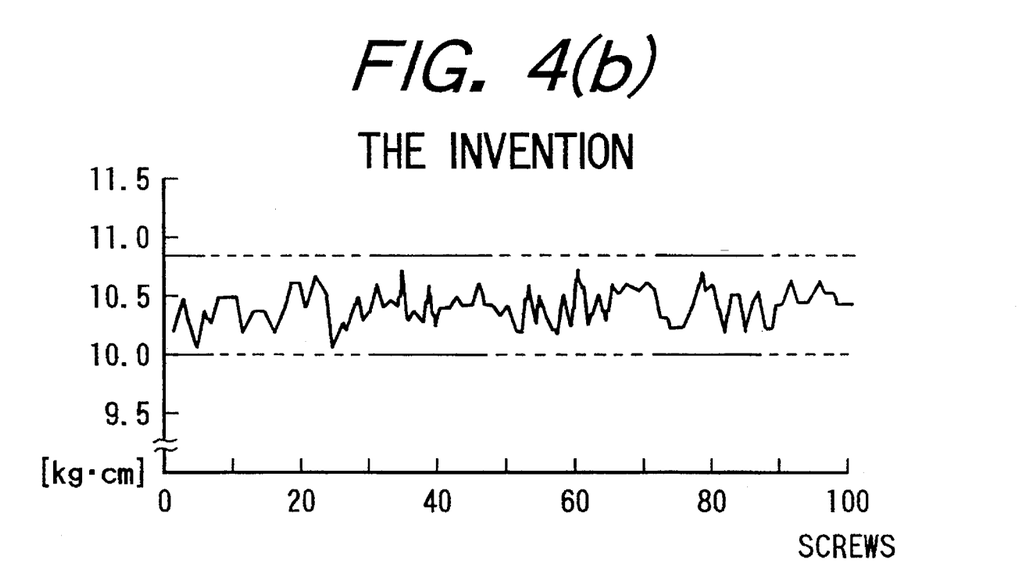
FIG. 4(b) is a graph which shows a variation in motor torque measured by a torque detecting apparatus of the invention.

FIG. 4(a) illustrates a variation in screw-tightening torque, when the three-phase motor 10 is employed to tighten 100 screws through a screw-tightening device, measured by a conventional motor control system which does not have the ripple reducer 36. Similarly, FIG. 4(b) illustrates a variation in screw-tightening torque, when the three-phase motor 10 is employed to tighten 100 screws through a screw-tightening device, measured by the motor control system 100 of the present invention. The graphs show that the use of the ripple reducer 36 in the torque determining circuit 18 eliminates the variation in screw-tightening torque effectively.

Figure 5:
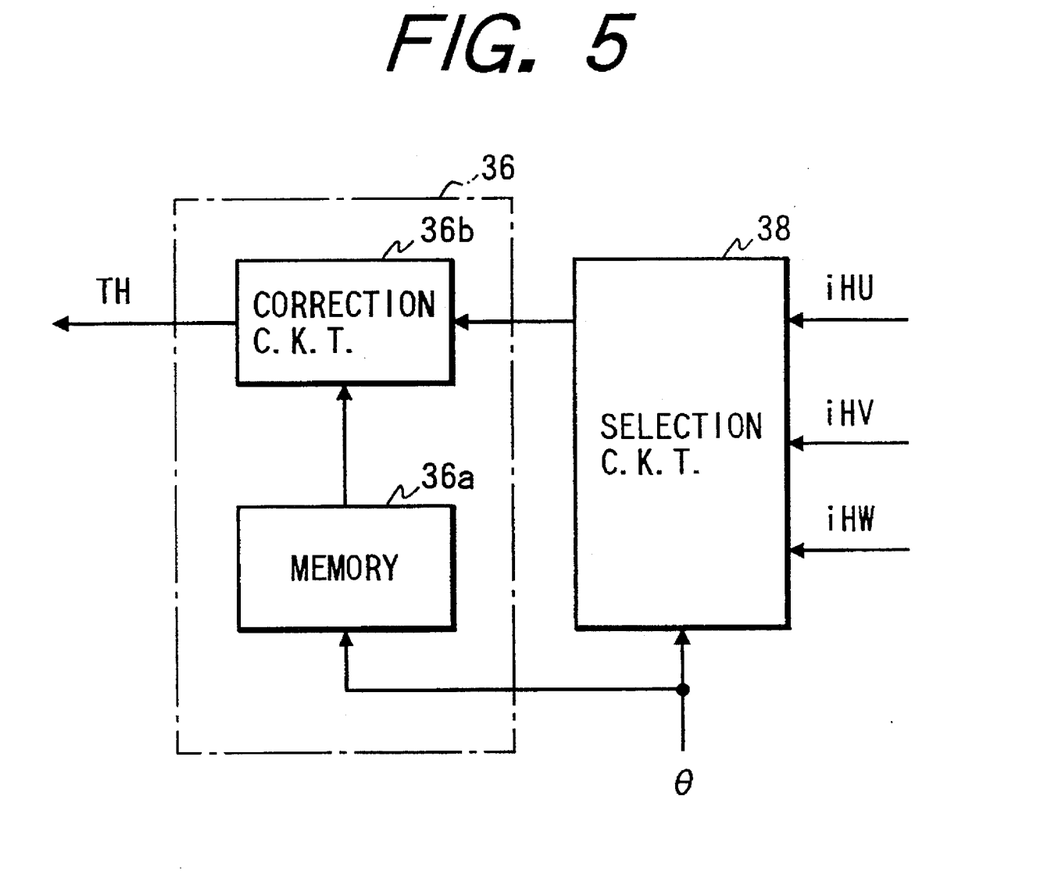
FIG. 5 is a circuit block diagram which shows a modification of a ripple reducer of a torque detecting apparatus of the invention.

FIG. 5 shows a modification of the ripple reducer 36 which is designed to reduce ripple contained in the current prodded by the selection circuit 38 without use of the above equations (6), (7), and (8).

The ripple reducer 36 as shown in the drawing includes a memory 36a and a correction circuit 36b. The memory stores therein correction values corresponding to the electrical angle θ for compensating for ripple components. The correction circuit 36b retrieves one of the correction values out of the memory 36a according to the electrical angle θ, and corrects a value of the current selected by the selecting circuit 38 using the correction value retrieved. These arrangements achieve a simple circuit structure of the ripple reducer 36.

Additionally, ripple components contained in the current selected by the selection circuit 38 may be measured experimentally by activating the three-phase motor 10 and storing them in the memory 36a for each given value of the electrical angle θ. This permits the ripple components to be removed from the current provided by the selection circuit 38 without the influence of structural variation of the three-phase motor 10 for improvement of motor control accuracy.

In the above embodiment, the signal processing circuit 14 determines the electrical angle θ of the three-phase motor 10 based on a detection signal outputted from the rotary encoder 12, and the target current determining circuit 30, the selection circuit 38, and the ripple reducer 36 operate according to the electrical angle θ. However, since the electrical angle θ corresponds to an angular position of the three-phase motor 10, the need of determining the electrical angle θ may be eliminated by operating the target current determining circuit 30, the selection circuit 38, and the ripple reducer 36 according to an angular position of the three-phase motor 10.

Further, the motor control system 100 of the invention may be used with a two-phase motor.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A torque detecting apparatus which is capable of use in a motor torque control circuit for controlling torque of a motor based on a difference between a target motor torque and a measured motor torque during rotation of said motor, comprising:

current detecting means for detecting phase currents flowing through all phase windings of said motor;

angular position detecting means for detecting an angular position of said motor; and torque correcting means for determining said measured motor torque during rotation of said motor and correcting said measured motor torque in accordance with a predetermined relationship between said phase currents detected by said current detecting means so as to reduce ripples in said measured motor torque, said torque correcting means including:

first means for selecting one of said phase currents having a maximum current value as detected by said current detecting means during rotation of said motor, and second means for correcting said selected phase current using a correction value which is based on said angular position of said motor detected by said angular position detecting means and which corresponds to one of said phase windings through flows said selected phase current, said corrected selected phase current being used to correct said measured motor torque according to said predetermined relationship.

2. A torque detecting apparatus as set forth in claim 1, wherein said angular position of said motor is expressed by an electrical angle.

3. A torque detecting apparatus as set forth in claim 1, wherein said correction value is a function of an electrical angle.

4. A torque detecting apparatus as set forth in claim 3, wherein said function of said electrical angle is given by values which correspond to said angular position of said motor and are stored in a memory.

5. A torque detecting apparatus as set forth in claim 1, wherein said motor is used in a servo control system.

6. A torque detecting apparatus as set forth in claim 1, wherein said motor is a three-phase motor having first, second, and third phases.

7. A torque detecting apparatus as set forth in claim 6, wherein said current detecting means measures currents flowing through at least said first and second phases of said motor and therefrom calculates a current flowing through said third phase of said motor, said measured and calculated currents of said first, second, and third phases changing according to said angular position of said motor.

8. A torque detecting apparatus as set forth in claim 1, wherein said angular position of said motor is represented by an electrical angle $\theta$, and wherein said correction value is one of $\sin \theta$, $\sin (\theta+120 \text{ deg.})$, and $\sin (\theta-120 \text{ deg.})$.

9. A torque detecting apparatus as set forth in claim 6, wherein said angular position of said motor is represented by an electrical angle $\theta$, and wherein said correction value is one of $\sin \theta$, $\sin (\theta+120 \text{ deg.})$, and $\sin (\theta-120 \text{ deg.})$.

10. A torque detecting apparatus as set forth in claim 1, wherein said second means includes a memory which stores therein ripple correction values determined for every given angular position of said motor according to variations in said phase currents, said second means reading out of said memory as said correction value one of said ripple correction values corresponding to said angular position of said motor.

11. A torque detecting apparatus as set forth in claim 10, wherein said ripple correction values are determined based on a value of said phase current flowing through each of said phase windings of said motor at each of said given angular positions of said motor.

12. A torque detecting apparatus as set forth in claim 1, wherein said measured motor torque is capable of being used in said motor torque control circuit to provide feedback control of said motor torque during rotation of said motor in accordance with said target motor torque.

13. A motor torque control apparatus for a motor having at least two phase windings, comprising:

a current detecting circuit which detects phase currents respectively flowing through each of said phase windings of said motor;

an angular position detecting circuit which detects an angular position of said motor;

a torque determining circuit which determines a measured motor torque during rotation of said motor and which corrects said measured motor torque in accordance with a predetermined relationship between said phase currents detected by said current detecting circuit so as to reduce ripples in said measured motor torque, said torque determining circuit including:

a selection circuit which selects one of said phase currents having a maximum current value as detected by said current detecting circuit during rotation of said motor, and a correcting circuit which corrects said selected phase current using a correction value which is based on said angular position of said motor detected by said angular position detecting means and which corresponds to one of said phase windings through flows said selected phase current, said corrected selected phase current being used to correct said measured motor torque according to said predetermined relationship; and a torque control circuit which outputs a torque control value for controlling said torque of said motor based on a difference between said corrected measured motor torque and a target motor torque.

14. A motor torque control apparatus as set forth in claim 13, wherein said motor is a three-phase motor having first, second, and third phases.

15. A torque detecting apparatus as set forth in claim 14, wherein said current detecting circuit measures currents flowing through at least said first and second phases of said motor and therefrom calculates a current flowing through said third phase of said motor, said measured and calculated currents of said first, second, and third phases changing according to said angular position of said motor.

16. A motor torque control apparatus as set forth in claim 13, wherein said angular position of said motor is represented by an electrical angle $\theta$, and wherein said correction value is one of $\sin \theta$, $\sin (\theta+120 \text{ deg.})$, and $\sin (\theta-120 \text{ deg.})$.

17. A motor torque control apparatus as set forth in claim 14, wherein said angular position of said motor is represented by an electrical angle $\theta$, and wherein said correction value is one of $\sin \theta$, $\sin (\theta+120 \text{ deg.})$, and $\sin (\theta-120 \text{ deg.})$.

18. A motor torque control apparatus as set forth in claim 13, wherein said correcting circuit includes a memory which stores therein ripple correction values determined for every given angular position of said motor according to variations in said phase currents, said correcting circuit reading out of said memory as said correction value one of said ripple correction values corresponding to said detected angular position of said motor.

19. A motor torque control apparatus as set forth in claim 18, wherein said ripple correction values are determined based on a value of said phase current flowing through each of said phase windings of said motor at each of said given angular positions of said motor.

* * * * *